United States Patent
Lee et al.

(10) Patent No.: US 9,128,225 B2
(45) Date of Patent: Sep. 8, 2015

(54) LIGHT GUIDE PLATE HAVING SAG CONTROL PATTERNS AND BACK LIGHT UNIT USING THE SAME

(75) Inventors: Dong Hyun Lee, Seoul (KR); Dong Mug Seong, Seoul (KR); Beom Sun Hong, Seoul (KR); Jun Phill Eom, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 61 days.

(21) Appl. No.: 13/821,711

(22) PCT Filed: May 2, 2011

(86) PCT No.: PCT/KR2011/003275
§ 371 (c)(1),
(2), (4) Date: Mar. 8, 2013

(87) PCT Pub. No.: WO2012/033275
PCT Pub. Date: Mar. 15, 2012

(65) Prior Publication Data
US 2013/0170248 A1 Jul. 4, 2013

(30) Foreign Application Priority Data
Sep. 9, 2010 (KR) .................. 10-2010-0088305

(51) Int. Cl.
*F21V 7/04* (2006.01)
*F21V 8/00* (2006.01)

(52) U.S. Cl.
CPC .............. *G02B 6/005* (2013.01); *G02B 6/0036* (2013.01); *G02B 6/0058* (2013.01)

(58) Field of Classification Search
CPC ...................................... G02B 6/005
USPC .................. 362/615, 617, 619, 607, 612, 628
See application file for complete search history.

(56) References Cited

U.S. PATENT DOCUMENTS

| | | | |
|---|---|---|---|
| 7,527,410 B2* | 5/2009 | Yoshizawa et al. | 362/615 |
| 7,780,330 B2* | 8/2010 | Aylward et al. | 362/613 |
| 8,348,489 B2* | 1/2013 | Holman et al. | 362/600 |

FOREIGN PATENT DOCUMENTS

| | | |
|---|---|---|
| CN | 101364004 A | 2/2009 |
| JP | 07-333442 | 12/1995 |

(Continued)

OTHER PUBLICATIONS

Taiwanese Office Action in Taiwanese Application No. 100115999, dated Jan. 20, 2014.

(Continued)

*Primary Examiner* — Vip Patel
(74) *Attorney, Agent, or Firm* — Saliwanchik, Lloyd & Eisenschenk

(57) ABSTRACT

The present invention relates to a backlight unit with sag control patterns, comprising a light source formed in a side surface of a light guide plate; and a plurality of optical patterns formed on a lower surface of the light guide plate, sag of the plurality of optical patterns increasing as the optical patterns become more distant from the light source. By controlling sag of optical patterns formed in a light guide plate, efficiency of light emitted from a backlight unit can be improved and uniformity of the light can be maintained. Also, since sag of optical patterns can be controlled, by increasing the number of optical patterns (by improving fill factor), light efficiency and uniformity can be controlled easily. Also, compared with a conventional method for manufacturing white dot patterns, white dot patterns can be more efficiently manufactured in terms of development time and costs.

20 Claims, 4 Drawing Sheets

(56) References Cited

FOREIGN PATENT DOCUMENTS

| | | |
|---|---|---|
| JP | 2004-053665 A | 2/2004 |
| JP | 2007-080559 A | 3/2007 |
| KR | 10-2004-0013486 A | 2/2004 |
| KR | 10-2005-0049594 A | 5/2005 |
| KR | 10-2007-0006389 A | 1/2007 |
| KR | 10-2010-0032988 A | 3/2010 |
| TW | M264503 U | 5/2005 |
| TW | 200527016 | 8/2005 |
| TW | 200907440 A | 2/2009 |
| TW | 201005390 A | 2/2010 |

OTHER PUBLICATIONS

International Search Report in International Application No. PCT/KR2011/003275, filed May 2, 2011.

* cited by examiner

LIGHT GUIDE PLATE HAVING SAG CONTROL PATTERNS AND BACK LIGHT UNIT USING THE SAME

CROSS-REFERENCE TO RELATED APPLICATIONS

This application is the U.S. national stage application of International Patent Application No. PCT/KR2011/003275, filed May 2, 2011, which claims priority to Korean Application No. 10-2010-0088305, filed Sep. 9, 2010, the disclosures of each of which are incorporated herein by reference in their entirety.

TECHNICAL FIELD

The present invention relates to a light guide plate and a backlight unit. More specifically, the present invention relates to a backlight unit with sag control patterns able to improve efficiency and preserve uniformity of light emitted from the backlight unit by controlling sag of an optical pattern formed on a light guide plate.

BACKGROUND ART

A backlight is a light emitting component installed behind an LCD. A backlight is used to improve legibility of a small-sized display. It is also used to emit light from a computer display or an LCD television as does a CRT.

A backlight has been regarded as a low-tech component for a while because manufacturing a backlight was relatively easy compared with other LCD components used for notebook computers or monitors. The significance of a backlight has been gradually increased, however; currently, it is one of key components affecting growth of LCD market. A backlight in good quality can dramatically improve image quality and color reproducibility. Therefore, it may be said that backlights hold the key to the advancement of LCD-TVs. Types of backlights include cold cathode fluorescent lamp (CCFL), external electrode fluorescent lamp (EEFL), light emitting diode (LED), and flat fluorescent lamp (FFL).

FIG. 1 is a cross sectional view of an edge-type backlight unit according to a prior art. In an edge-type backlight unit according to a prior art, light emitted from a light source 110 propagates through a light guide plate 140 making total reflection. The critical angle for total reflection is determined by the ratio of a refractive index of a propagation medium to that of air layer, which can be derived from Snell's law. A ray of light striking a medium boundary at an angle below the critical angle propagates with a minimal loss of energy unless the light hits a structure which makes the light reflect more than the critical angle. In case of a printed light guide plate, diffusion and transmission of light are made to occur through a white dot pattern 130.

DISCLOSURE OF INVENTION

Technical Problem

The white dot pattern 130 above can be manufactured by injection molding, printing, laser processing, and stamping. The injection molding process is simple compared with the printing method but inadequate for mass production, vulnerable to bending, and difficult in achieving high yield rate. Development lead time and a production period can be reduced by employing the printing method, which also provides excellent reproducibility; however, a manufacturing process is sophisticated and requires a good many additional manufacturing facilities and may suffer defect in a large volume. The laser processing is also excellent in terms of development lead time and a production period but at the same time, craters can be formed and thus light efficiency is decreased (down to the level equaling that of the printing method). The stamping method provides excellent reproducibility and is adequate for mass production simplifying a related manufacturing process; however, the entire development period grows longer when a production model is changed.

In particular, a white dot pattern causes loss of light and does not allow an optimal use of light because of a limitation on fill factor. The fill factor denotes spatial density with which a white dot pattern is arranged. The white dot patterns above should maintain a predetermined distance from each other and therefore, the number of white dot patterns cannot be increased arbitrarily. On the other hand, a sufficient number of white dot patterns are required to control the angles at which light rays are emitted to the outside and to control the area through which the light rays come out. However, due to the limitation on the fill factor described above, the angle and the area for emitting light is not controlled in an optimal way.

Solution to Problem

The present invention has been made in an effort to provide a backlight unit with sag control patterns able to easily control efficiency and uniformity of light by removing drawbacks in manufacturing white dot patterns and overcoming a limitation on fill factor.

To solve the technical problem, a structure of a backlight unit with sag control patterns according to the present invention comprises a light source formed in a side surface of a light guide plate; and a plurality of optical patterns formed on a lower surface of the light guide plate, sag of the plurality of optical patterns increasing as the optical patterns become more distant from the light source.

At this time, it is preferable for the optical pattern to be a concave pattern in view of light efficiency and uniformity; in this case, each of the plurality of optical patterns can be implemented to have the same diameter.

Also, the plurality of optical patterns can be arranged uniformly, thereby increasing fill factor.

In addition, sag of the optical pattern can be made to satisfy a range of 0.01 to 0.3. In particular, the optical pattern can be implemented so that the diameter thereof ranges from 1 μm to 500 μm.

More specifically, the backlight unit can comprise a light guide plate receiving light emitted from a light source and guiding the light to the front, the light guiding plate being equipped with one surface emitting light and the other surface opposite to the light emitting surface and the other surface being equipped with one or more optical patterns, where sag increases as the optical patterns become more distant from the light source.

Furthermore, a plurality of light sources constitutes the light source and can be formed on two or more side surfaces of the light guide plate.

The shape of the optical pattern can be formed by using one or more from among a micro lens, a prism, a pyramid, and a lenticular lens; and at the same time, can employ a structure of the light guide plate without modification.

Meanwhile, a backlight unit comprising a light guide plate with sag control patterns can further comprise a diffusion layer and a reflection layer formed respectively on the upper and the lower surface of the light guide plate.

Advantageous Effects of Invention

By controlling sag of optical patterns formed in a light guide plate, efficiency of light emitted from a backlight unit can be improved and uniformity of the light can be maintained. Also, since sag of optical patterns can be controlled, by increasing the number of optical patterns (by improving fill factor), light efficiency and uniformity can be controlled easily.

BRIEF DESCRIPTION OF DRAWINGS

The implementation of this document will be described in detail with reference to the following drawings in which like numerals refer to like elements.

Figure 1:
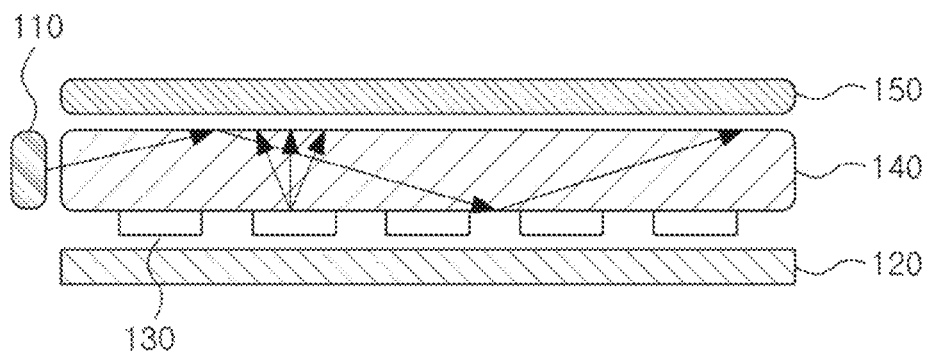
FIG. 1 is a cross sectional view of an edge-type backlight unit according to a prior art.

BEST MODE FOR CARRYING OUT THE INVENTION he present invention improves light efficiency, controls light uniformity easily, and reduces manufacturing time and costs by realizing a backlight unit equipped with a light guide plate having a structure disposing optical patterns in such a way that sag the optical patterns is gradually increased from a light incident surface.

Mode for the Invention

In what follows, preferred embodiments of a backlight unit with sag control patterns according to the present invention will be described in detail with reference to appended drawings. Meanwhile, if it is determined that specific description of related functions or a structure known to the public unnecessarily leads to misunderstanding of main points of the present invention, corresponding descriptions are omitted. Also, size of each element in the drawings can be exaggerated for the convenience of description, which does not reflect actual dimensions of the corresponding elements.

Figure 2:
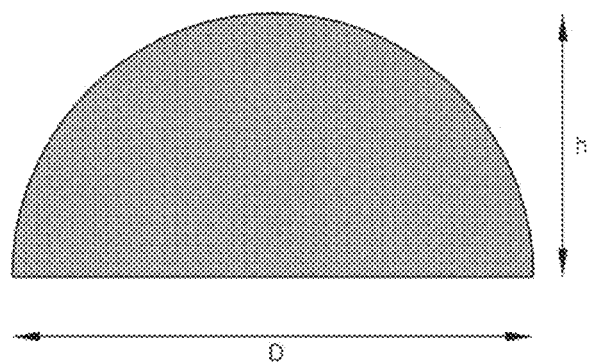
FIG. 2 is a cross sectional view of a pattern formed in a backlight unit with sag control patterns according to the present invention.

FIG. 2 is a cross sectional view illustrating a shape of an optical pattern formed in a light guide plate with sag control patterns or in a backlight unit comprising the light guide plate.

With reference to FIG. 2, the present invention, by making use of an optical pattern (for example, a micro lens, a prism, a pyramid, or a lenticular lens) formed in a light guide plate or in a backlight unit comprising the light guide plate, controls a reflection angle and a reflection range of light propagating the light guide plate. At this point, the optical pattern can employ a single pattern or a combination of patterns depending on design principles of a light guide plate. In this document, it is assumed that a micro lens is employed for the optical pattern.

A micro lens sheet is a sheet (a thin plate) in which very small lenses of micrometer scale are arranged in a regular pattern. By using the sheet for a light guide plate, the present invention forms a micro lens optical pattern on the light guide plate. In particular, as shown in FIG. 2, sag, which is a terminology to define the shape of a micro lens, is expressed as follows:

$$sag = height(h)/diameter(D).$$

To be specific, a spatial period of lenses is the same across the micro lens array formed in a light guide plate. However, by controlling the size of each lens, namely controlling sag, light emission angle and uniformity can be controlled at the same time. Detailed description of the above is given in the following with reference to FIG. 3.

Figure 3:
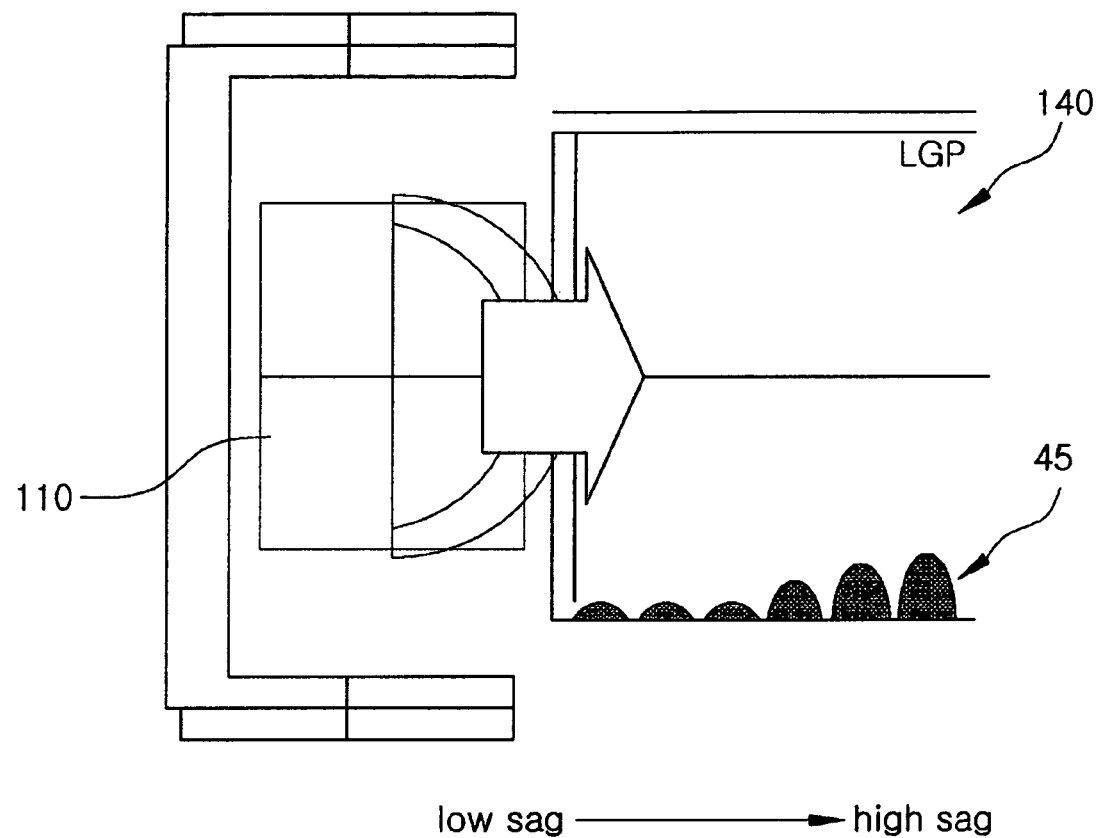
FIG. 3 is a cross sectional view of a backlight unit with sag control patterns according to the present invention.

FIG. 3 is a cross sectional view of a backlight unit comprising a light guide plate with sag control patterns according to the present invention. With reference to FIG. 3, it can be seen that sag of an optical pattern of micro lenses 145 formed in the light guide plate 140 increases as the pattern becomes more distant from a light source 110.

In other words, sag increases as the height h of a micro lens 145 from the light source 110 increases while the diameter D of the micro lens is kept in the same length. At this point, it is preferred that the diameter D is fixed to an arbitrary value ranging from 5 µm to 3 mm and sag is made to increase within a range of 0.05 to 0.5 as the height h measured from the light source is increased; the variation range is not necessarily limited to the above but can be changed depending on the thickness and size of the light guide plate 140. In particular, if sag of the light guide plate is determined within a range of 0.01 to 0.3, total reflection is minimized and thus light efficiency can be improved.

The above arrangement is not only required for maintaining uniformity of light emitted through the light guide plate 140 but also convenient for controlling light distribution.

Also, the optical pattern of micro lenses 145 formed in the light guide plate 140 allows both convex and concave optical pattern. However, an optical pattern of hole-type micro lenses 145 exhibits more excellent performance in terms of brightness (which can also be called light efficiency or total amount of light) and uniformity.

Figure 4:
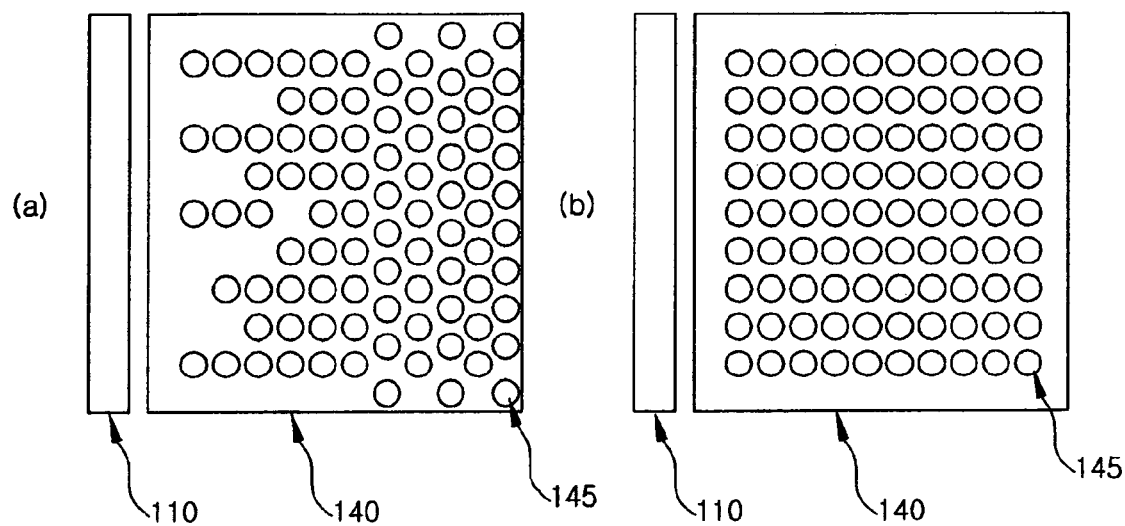
FIG. 4 is a plan view of a backlight unit with sag control patterns according to the present invention.

FIG. 4 is a plan view of a backlight unit with sag control patterns according to the present invention. With reference to FIG. 4, (a) illustrates a structure where spatial arrangement of a micro lens 145 optical pattern is irregular. More specifically, density of an area close to the light source 110 is low while density is becoming higher as it is more distant from the light source 110. Meanwhile, (b) illustrates a structure where spatial arrangement of a micro lens 145 optical pattern is regular across the entire light guide plate 140 and sag is increased as the optical patten is more distant from the light source 110. This kind of arrangement can provide the same degree of uniformity as (a) and at the same time, can increase light efficiency.

Figure 5:
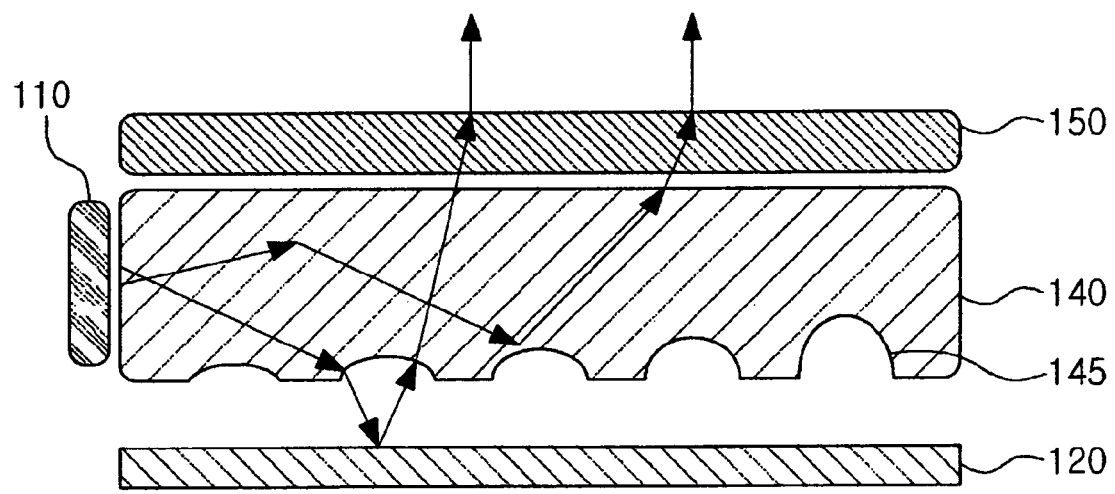
FIG. 5 is a cross sectional view illustrating an optical function of a backlight unit with sag control patterns according to the present invention.

FIG. 5 is a cross sectional view illustrating an optical function of a backlight unit with sag control patterns according to the present invention. FIG. 5 shows change of a propagation path of light emitted from a light source 110 due to micro lenses 145 formed in a light guide plate 140. If the light propagating through the light guide plate 140 hits the micro lenses 145, the light propagates along either of two different paths. One of the two paths guides the light which has passed the micro lenses 145 to strike a reflection layer 120 located at the bottom. When the light reflected at the bottom propagates again into the surface of the micro lenses 145, incident angle of the light exceeds a critical angle and the light is emitted to the outside through a diffusion layer 150. The other path guides the light striking the micro lenses 145 to reflect directly from the surface of the micro lenses 145 and the reflection angle exceeds the critical angle immediately. The light whose reflection angle exceeds the critical angle comes out of the upper surface of the light guide plate 140.

The light propagation paths above can be implemented by controlling sag of the micro lenses 145. In other words, by controlling sag of the micro lenses 145 according to the distance from the light source 145, the angle at which a ray of light rays is emitted to the outside and the area through which light rays come out are controlled; and therefore, the light uniformity and efficiency can be controlled at the same time.

Figure 6:
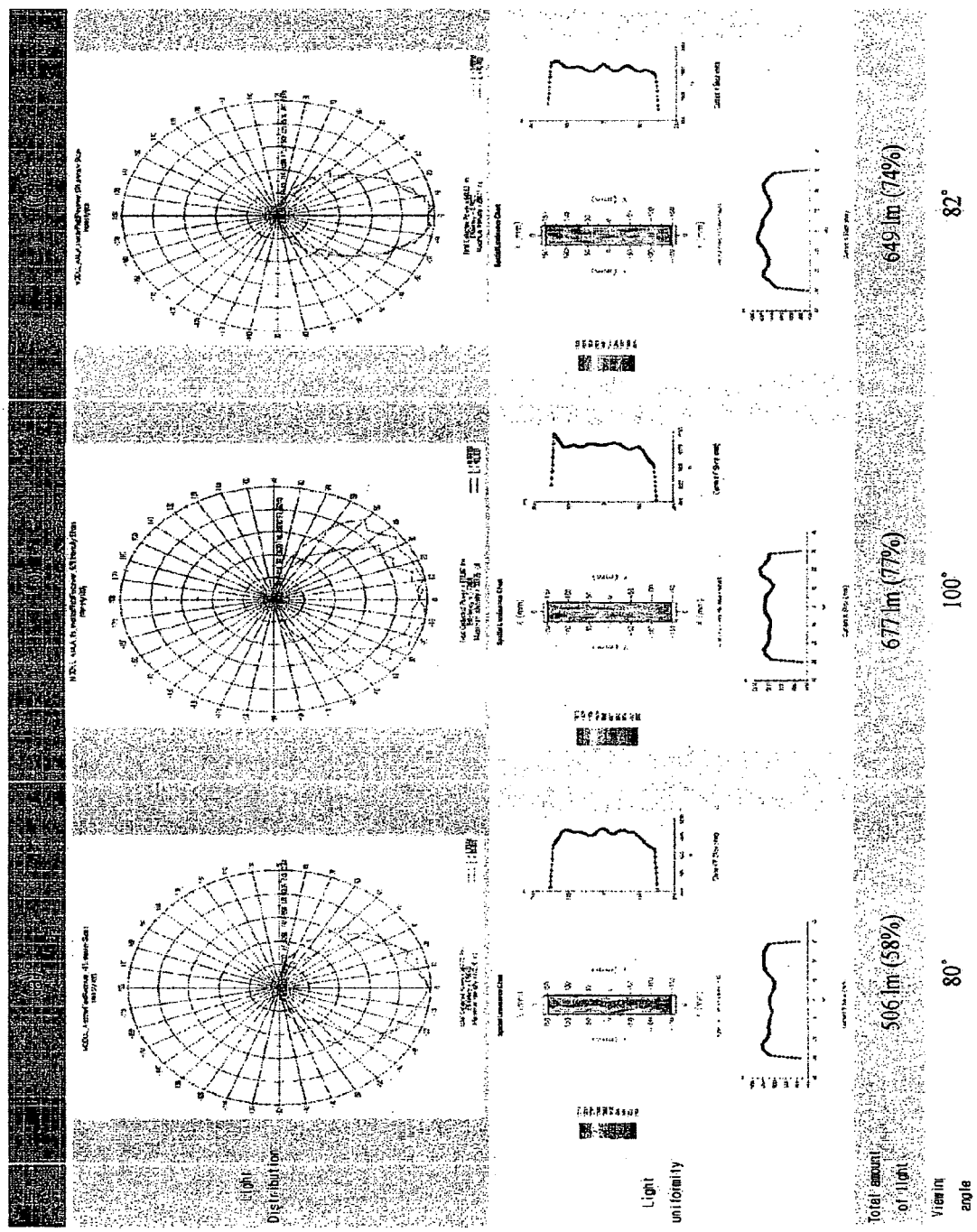
FIG. 6 is a graph illustrating optical characteristics of a backlight unit with sag control patterns according to the present invention.

FIG. 6 is a graph illustrating optical characteristics of a backlight unit with sag control patterns according to the present invention. With reference to FIG. 6, (a) illustrates optical characteristics of a backlight unit where white dot patterns and diffusion sheets are formed in a light guide plate according to a prior art. (b) illustrates optical characteristics of a backlight unit where micro lens 145 patterns are formed in a light guide plate according to the present invention. (c) illustrates optical characteristics of a backlight unit where micro lens 145 patterns and diffusion sheets 150 are formed in a light guide plate according to the present invention.

If light distribution is examined from the figure, (a), (b), and (c) show slightly different light distributions from each other. In the figure, green and red line represent a direction along which light is illuminated; the green line represents a south and north direction while the red line an east and west direction. The light distribution exhibits such a pattern that it becomes wide in (b) while narrow in (c); by controlling sag of the micro lenses 145, variation of width of the distribution can be further controlled. Meanwhile, if light uniformity is examined, each of (a), (b), and (c) shows a satisfactory pattern. However, in case of (a), the total amount of light is 58%, indicating a very low light efficiency. On the other hand, (b) an (c) provide 77% and 74% respectively, indicating that light efficiency has been greatly improved. In addition, in terms of a viewing angle, (b) and (c) can secure a wider viewing angle than (a).

By controlling sag of optical patterns formed in a light guide plate, efficiency of light emitted from a backlight unit can be improved and uniformity of the light can be maintained. Also, since sag of optical patterns can be controlled, by increasing the number of optical patterns (by improving fill factor), light efficiency and uniformity can be controlled easily.

Also, compared with a conventional method for manufacturing white dot patterns, white dot patterns can be more efficiently manufactured in terms of development time and costs.

Specific embodiments have been described in the detailed description of the present invention. However, various modifications are also possible if the modifications belong to the scope of the present invention. The technical principles and the spirit of the present invention should not be limited to the embodiments of the present invention described above and should be understood by those as defined not only by the appended claims but also by the equivalent of the appended claims.

The invention claimed is:

1. A light guiding plate with sag control patterns, comprising:
   one surface emitting ht and another surface opposite to the light emitting surface, the another surface being formed with one or more optical patterns, wherein sags of the one or more optical patterns increase as the optical patterns become more distant from a light source,
   wherein each of the optical patterns is a concave pattern formed in a depth direction of the light guide plate.

2. The light guide plate of claim 1, wherein each of the optical patterns has the same diameter.

3. The light guide plate of claim 2, wherein the optical patterns are disposed uniformly.

4. The light guide plate of claim 2, wherein shape of the optical pattern is formed by using one or more from among a micro lens, a prism, a pyramid, and a lenticular lens.

5. The light guide plate of claim 2, wherein sag of the optical patterns satisfy a range of 0.01 to 0.5.

6. The light guide plate of claim 5, wherein diameter of the optical pattern ranges from 1 µm to 3 mm.

7. A backlight unit, comprising:
   a light guide plate receiving emitted from a light source and guiding the light in an upward direction,
   the tight guiding plate comprising one surface emitting light and another surface opposite to the light emitting surface,
   the another surface being formed with one or more optical patterns, wherein sags of the one or more optical patterns increase as the optical patterns become more distant from the light source,
   wherein each of the optical patterns is a concave pattern formed in a depth direction of the light guide plate.

8. The backlight unit of claim 7, wherein each of the optical patterns has the same diameter.

9. The backlight unit with sag control patterns of claim 8, wherein shape of the optical pattern is formed by using one or more from among a micro lens, a prism, a pyramid, and a lenticular lens.

10. The backlight unit with sag control pattern of claim 8, wherein sag of the optical patterns satisfy a range of 0.01 to 0.3.

11. The backlight unit with sag control pattern of claim 10, wherein diameter of the optical pattern ranges from 1 µm to 500 µm.

12. The backlight unit of claim 7, wherein the optical patterns are disposed uniformly.

13. The backlight unit of claim 7, further comprising a diffusion layer and a reflection layer formed respectively on an upper and a lower surface of the light guide plate.

14. A backlight unit, comprising:
   a light guide plate receiving light emitted from a light source and guiding the light in an upward direction,
   the light guiding plate comprising one surface emitting light and another surface opposite to the light emitting surface,
   the another surface being formed with one or more optical patterns, wherein sags of the optical patterns increase as the optical patterns become more distant from the light source,
   wherein the light source is formed on two or more side surfaces of the light guide plate, wherein each of the one or more optical patterns is a concave pattern formed in a depth direction of the light guide plate.

15. The backlight unit of claim 14, wherein each of the optical patterns has the same diameter.

16. The backlight unit with sag control patterns of claim 15, wherein shape of the optical pattern is formed by using one or more from among a micro lens, a prism, a pyramid, and a lenticular lens.

17. The backlight unit with sag control pattern of claim 15, wherein sag of the optical patterns satisfy a range of 0.01 to 0.3.

18. The backlight unit with sag control pattern of claim 17, wherein diameter of the optical pattern ranges from 1 µm to 500 µm.

19. The backlight unit of claim 14, wherein the optical patterns are disposed uniformly.

20. The backlight unit of claim 14, further comprising a diffusion layer and a reflection layer formed respectively on an upper and a lower surface of the light guide plate.

\* \* \* \* \*